UNITED STATES PATENT OFFICE.

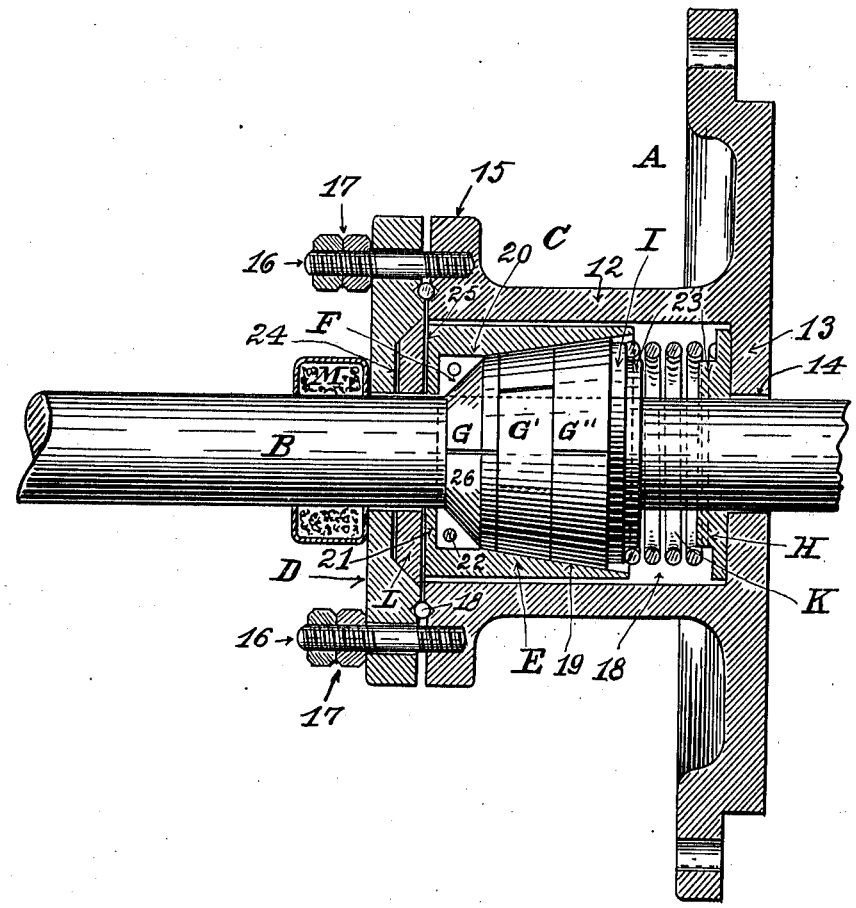

ADOLF GOTTWALD, OF CHICAGO, ILLINOIS.

METALLIC ROD-PACKING.

1,027,043.      Specification of Letters Patent.      Patented May 21, 1912.

Application filed December 27, 1910. Serial No. 599,239.

*To all whom it may concern:*

Be it known that I, ADOLF GOTTWALD, a subject of the Emperor of Austria-Hungary, and resident of Chicago, in the county of Cook and State of Illinois, have invented certain new and useful Improvements in Metallic Rod-Packing; and I do hereby declare that the following description of my said invention, taken in connection with the accompanying sheet of drawings, forms a full, clear, and exact specification.

This invention has general reference to rod-packings; and it consists, essentially, in the novel and peculiar combination of parts, and details of construction, as hereinafter first fully set forth and described, and then pointed out in the claim.

In the drawings already mentioned, which serve to illustrate this invention more fully, the figure is a longitudinal sectional elevation of a cylinder head with its piston rod and the stuffing box for the same.

A, in this drawing designates the head of a cylinder of a fluid motor, such as a locomotive and other horizontal engine, and B, the piston rod thereof. On this cylinder head is formed a stuffing box C, comprising a cylindrical shell, 12, having a bottom 13, and being formed integral with the said cylinder head. This shell 12 is centrally bored at 14, for the piston rod B, and it has at its outer end a flange, 15, in which stud-bolts 16, are tapped to securely attach to the flange a gland D, by the nuts 17; a preferably metallic packing ring 18 being located between the outer surface of the flange 15, and the inner surface of the gland D, to afford a tight joint between these two parts.

In the cylindrical bore 18 of the shell 12, there is located a tubular sleeve E, smaller in external diameter than the bore 18, said sleeve E having a tapering bore 19, terminating in a straight cylindrical portion 20, which latter bore ends at the bottom 21 of said sleeve E, said bottom being also bored for the passage of the piston rod B. In the straight portion 20 of the sleeve E, there is, removably placed, a two-part ring F, triangular in cross section, the members of the two-part ring being provided with dowel-pins 22, designed to properly locate the two parts in juxtaposition at their adjoining edges.

In the tapering bore of the sleeve E there are located several metallic packing rings G, G', G'', bored to fit the piston rod B by a snug fit, and turned at their peripheries to snugly fit the tapering bore 19 of the said sleeve E, said packing rings being split in two or more parts each, as will hereinafter more fully appear.

In the back portion of the cylindrical bore 18 of the stuffing box C there is located a bored disk H, and immediately behind the rear packing ring G'' there is located a follower I, the disk H and the follower I having on their opposing flanks shoulders 23, whereupon is centered a spiral spring K, the function of which is to force the follower, and by it, the packing rings G, G', G'', into the tapering bore of the sleeve E.

The gland D has on its inner face a central, tapering bore 24, or recess, in which is located a correspondingly-shaped ring L, against the face of which (25), the back of the bottom 21 bears, the two meeting faces being preferably carefully scraped and ground to a perfectly tight joint. In front of this gland D there is located a hollow casing M, which is packed with an absorbent material saturated with a lubricant to serve the purpose of a lubricator for the piston rod.

In horizontal engines there is a tendency for the piston rod to sag owing to its weight and the weight of the cross head and the piston wearing downwardly thus bringing the piston rod out of proper alinement with relation to the central or axial line of the cylinder. This sagging of the piston rod causes leakage of the stuffing box unless guarded against in the manner provided for by my invention. Thus, when the piston rod is out of axial alinement, the sleeve E with its interior parts will move with the piston rod owing to the fact that the external diameter of the sleeve is less than the internal diameter of the bore of the shell 12, so that the piston rod remains tightly packed until the packing rings are worn out, when new packing rings can be inserted without dismounting the cylinder or removing the cross head from the piston rod, by releasing the gland, withdrawing the sleeve E, and then withdrawing the rings G, G', G'', and F, from the sleeve and placing new ones in position, which rings, being all composed of several parts each, can be placed over the piston rod and then pushed into the sleeve E.

In practice I prefer to produce the ring

F in cast iron to enable it to withstand the strain to which it is subjected by the tapering end 26, of the packing ring G being forced into its tapering bore to contract the packing ring G to cause it to hug the piston rod closely, but the packing rings G, G', and G'', I prefer to produce from soft, antifriction metal such as lead, tin, the alloys of lead, copper and tin, &c., usually termed "Babbitt metals", or such other metals as experience has demonstrated to be suitable for the object in view.

The operation of this metallic packing for piston rods, valve rods, &c., is obvious from the foregoing specification, so that I deem it superfluous to further describe the same.

By constructing a packing box for piston rods as described, I attain the advantages that when renewals become necessary, and this happens very frequently in locomotive engines, the engine need not be dismounted and that only the four rings G, G', G'', and the triangular ring F need replacing, which rings when cast in metal molds need no machining and are, therefore, very cheap, especially the rings G, G', G'', which can be remelted and recast at a nominal cost.

I have heretofore described the gland D as having on its inner face a central conical bore or recess in which there is located a correspondingly-shaped ring L. This ring is usually made from brass or bronze, to avoid the tendency of rust forming between the adjacent surfaces of the gland and the bottom of the tubular sleeve E. I may, however, dispense with this ring L and permit the end of the tubular sleeve E to bear directly against the inner face of the gland D, which, in this case, is devoid of the conical recess therein.

Having thus fully described this invention, I claim as new and desire to secure to me by Letters Patent of the United States—

In combination with a cylinder head having a cylindrical shell, a gland secured to the outer end of the shell, said gland being formed on its inner face with a comparatively shallow central tapering bore having a bottom wall which is flat, the greatest diameter of which bore is approximately equal to the diameter of the inner circumference of the shell, a ring having a tapered periphery conformably received in said tapering bore and being of a thickness slightly less than the depth of said bore, so that the outer face of the ring is substantially flush with the inner face of the gland, the inner face of the ring being normally spaced from the bottom wall of said tapering bore, a tubular sleeve having its outer end closed and bearing against the outer face of said ring, packing rings in said sleeve, and a spring to force said packing rings in the sleeve and to force the closed end of the latter against the outer face of said ring.

In testimony that I claim the foregoing as my invention, I have hereunto set my hand in the presence of two subscribing witnesses.

ADOLF GOTTWALD.

Witnesses:
MICHAEL J. STARK,
MAYMIE F. SULLIVAN.